United States Patent
Lee et al.

(10) Patent No.: US 7,303,839 B2
(45) Date of Patent: *Dec. 4, 2007

(54) NEGATIVE ELECTRODE FOR LITHIUM SULFUR BATTERY, METHOD OF PREPARING SAME AND LITHIUM SULFUR BATTERY COMPRISING SAME

(75) Inventors: Jong-Ki Lee, Seoul (KR); Jea-Woan Lee, Suwon (KR); Chung-Kun Cho, Suwon (KR); Sang-Mock Lee, Suwon (KR); Min-Seuk Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 577 days.

This patent is subject to a terminal disclaimer.

(21) Appl. No.: 10/688,781

(22) Filed: Oct. 17, 2003

(65) Prior Publication Data

US 2004/0137330 A1    Jul. 15, 2004

(30) Foreign Application Priority Data

Oct. 18, 2002    (KR) ...................... 10-2002-0063834

(51) Int. Cl.
*H01M 4/58*    (2006.01)

(52) U.S. Cl. ................. 429/231.95; 429/128; 429/246; 429/208

(58) Field of Classification Search ........... 429/231.95, 429/128, 246, 208
See application file for complete search history.

(56) References Cited

U.S. PATENT DOCUMENTS

| | | | | |
|---|---|---|---|---|
| 6,025,094 A | * | 2/2000 | Visco et al. | 429/231.95 |
| 6,200,707 B1 | * | 3/2001 | Takada et al. | 429/304 |
| 6,368,746 B1 | * | 4/2002 | Takada et al. | 429/208 |
| 6,699,619 B2 | * | 3/2004 | Kugai et al. | 429/246 |
| 6,713,216 B2 | * | 3/2004 | Kugai et al. | 429/231.95 |
| 6,911,280 B1 | * | 6/2005 | De Jonghe et al. | 429/246 |
| 2002/0012846 A1 | | 1/2002 | Skotheim et al. | |

FOREIGN PATENT DOCUMENTS

WO    WO 01/39302 A1    5/2001

* cited by examiner

*Primary Examiner*—Laura Weiner
(74) *Attorney, Agent, or Firm*—Christie, Parker & Hale, LLP

(57) ABSTRACT

Disclosed is a negative electrode for a lithium sulfur battery. The negative electrode includes a lithium metal, a pre-treatment layer, and a protection layer for the lithium metal. The pre-treatment layer has a thickness of 50 to 5000 Å and includes a lithium ion conductive material with an ionic conductivity of at least $1 \times 10^{-10}$ S/cm.

14 Claims, 3 Drawing Sheets

NEGATIVE ELECTRODE FOR LITHIUM SULFUR BATTERY, METHOD OF PREPARING SAME AND LITHIUM SULFUR BATTERY COMPRISING SAME

CROSS REFERENCE TO RELATED APPLICATION

This application claims priority of application No. 2002-63834 filed in the Korean Intellectual Property Office on Oct. 18, 2002, the disclosure of which is incorporated herein by reference.

FIELD OF THE INVENTION

The present invention relates to a negative electrode for a lithium sulfur battery, a method of preparing the same, and a lithium sulfur battery comprising the same, and more particularly, to a negative electrode for a lithium sulfur battery including a pre-treatment layer with good lithium ionic conductivity, a method of preparing the same, and a lithium sulfur battery comprising the same.

BACKGROUND OF THE INVENTION

The development of portable electronic devices has led to a corresponding increase in the demand for secondary batteries having both a lighter weight and a higher capacity. To satisfy these demands, the most promising approach is a lithium-sulfur battery with a positive electrode including a sulfur-based compound.

Lithium-sulfur batteries use sulfur-based compounds with sulfur-sulfur bonds as a positive active material, and a lithium metal or a carbon-based compound as a negative active material. The carbon-based compound is one that can reversibly intercalate or deintercalate metal ions, such as lithium ions. Upon discharging (i.e., electrochemical reduction), the sulfur-sulfur bonds are cleaved, resulting in a decrease in the oxidation number of sulfur (S). Upon recharging (i.e., electrochemical oxidation), the sulfur-sulfur bonds are re-formed, resulting in an increase in the oxidation number of the S. The electrical energy is stored in the battery as chemical energy during charging, and is converted back to electrical energy during discharging.

The light weight and good energy density of lithium metal has brought about its wide use as a negative active material for lithium sulfur batteries. However, the good reactivity of lithium metal may cause deterioration of cycle life characteristics. Studies regarding a prevention layer have been undertaken in order to address such a shortcoming.

One of the prevention layers evaluated is LIPON (lithium phosphorous oxy-nitride), a lithium ion conductor. The LIPON is formed by sputtering a target material such as $Li_3PO_4$ under a nitrogen gas atmosphere. This approach has shortcomings in that nitrogen gas and the $Li_3PO_4$ target material react with lithium metal to form a poorly adhering black porous lithium composite compound byproduct on the surface of the lithium metal.

To prevent production of the byproduct, a pre-treatment layer is disclosed in Published U.S. patent application Ser. No. 2002/0012846 A1 (USA, Moltech). The pre-treatment layer includes materials such as $Li_2CO_3$, derived from a reaction between gaseous material such as plasma $CO_2$ and a surface of the lithium metal, or metals capable of alloying with lithium, such as copper.

However, the $Li_2CO_3$ pre-treatment layer has insufficient lithium ionic conductivity (about $1\times10^{-12}$ S/cm or less at room temperature), and it causes structural instability due to volume increases. In addition, this process requires additional equipment such as a plasma device, so the production cost is high, and it requires different conditions from the prevention layer to complete the process.

SUMMARY OF THE INVENTION

The present invention provides a negative electrode for a lithium sulfur battery including a pre-treatment layer with good lithium ionic conductivity and substantially no change in volume. The negative electrode for a lithium sulfur battery can be prepared using a simple process.

In one embodiment, the invention is directed to a negative electrode for a lithium sulfur battery including a lithium metal; a lithium ion conductive material-included pre-treatment layer formed on the lithium metal, with a thickness of 50 to 5000 Å and ionic conductivity of at least $1\times10^{-10}$ S/cm and a protection layer for the lithium metal formed on the pre-treatment layer.

In another embodiment, the present invention provides a method of preparing a negative electrode for a lithium sulfur battery. In this method, a pre-treatment layer is deposited on lithium metal under an inert gas atmosphere, the pre-treatment layer including a lithium ion conductive material with ionic conductivity of at least $1\times10^{-10}$ S/cm. Thereafter, a protection layer for the lithium metal is deposited on the pre-treatment layer.

The present invention is also directed to a lithium sulfur battery including the negative electrode, a positive electrode, and an electrolyte. The positive electrode includes a positive active material selected from elemental sulfur, a sulfur-based compound, and mixtures thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Additional features and advantages of the invention will be set forth in the following description, and in part will be apparent from the description, or they may be learned by practice of the invention. The advantages of the invention will be realized and attained by the structure particularly pointed out in the written description and claims hereof, as well as in the appended drawings. It is to be understood that both the foregoing general description and the following detailed description are exemplary and explanatory, and are intended to provide further explanation of the invention as claimed.

The present invention relates to a new pre-treatment layer formed between a protection layer and lithium metal. The pre-treatment layer prevents generation of a byproduct, a black porous lithium composite compound with poor adhesion, that is produced by a reaction of nitrogen gas and a Li$_3$PO$_4$ target material with lithium metal during the formation of a LIPON (lithium phosphorus oxy nitride) protection layer. The pre-treatment layer is a barrier for chemical reactions, and it allows lithium ions to pass therethrough.

The pre-treatment layer includes a lithium ion conductive material having lithium ionic conductivity of at least 1×10$^{-10}$ S/cm, and preferably 1×10$^{-10}$ S/cm to 1×10$^{-6}$ S/cm. The lithium ion conductive material may be a compound represented by Formula 1.

where, 2<x<4 and 3<y<5. Preferably, x is 3 and y is 4.

The compound has about 100 to 10,000 times the ionic conductivity of Li$_2$CO$_3$, which is a pre-treatment material. Such a high ionic conductivity facilitates surprisingly faster transfer of lithium ions as compared to Li$_2$CO$_3$.

The compound has no substantial change in volume, thereby preventing the shortcomings of the conventional pre-treatment material associated with a change in volume.

Figure 2:
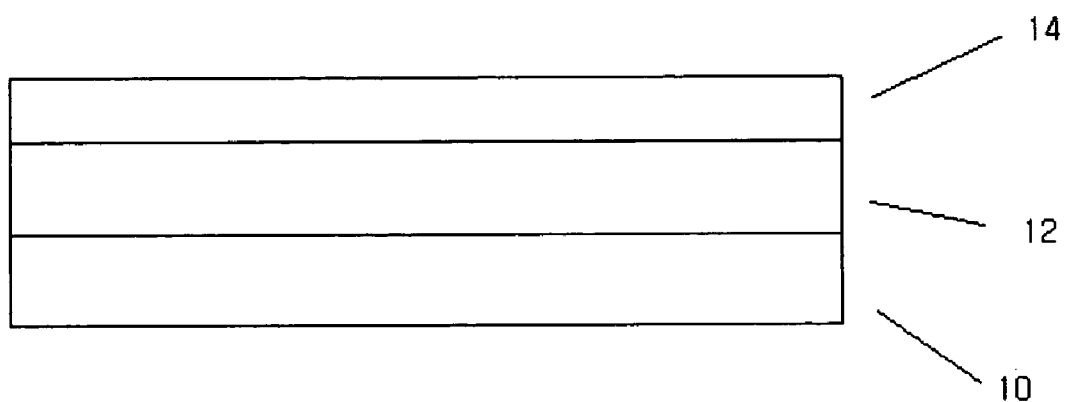
FIG. 2 is a drawing illustrating a negative electrode of the present invention.

A negative electrode according to the present invention includes a lithium metal 10, the pre-treatment layer 12 on the lithium metal 10, and a protection layer 14 for the lithium metal 10 on the pre-treatment layer as shown in FIG. 2.

The pre-treatment layer preferably has a thickness of 50 to 5000 Å. A thickness of less than 50 Å makes it difficult to work as a barrier, and a thickness of more than 5000 Å causes an increase in resistance to lithium ionic conductance.

The protection layer for the lithium metal includes Li$_a$PO$_b$N$_c$, where a is 2 to 4, b is 3 to 5, and c is 0.1 to 0.9, and it is preferably Li$_{2.9}$PO$_{3.3}$N$_{0.46}$. The thickness of the protection layer is 1000 Å to 50 μm. A thickness of less than 1000 Å makes it impossible to work as a protection layer, and a thickness of more than 50 μm increases the thickness of the electrode, thereby decreasing energy density.

A method of preparing the negative electrode will now be described in more detail.

A pre-treatment layer is deposited on a lithium metal using a target under an inert gas atmosphere. The pre-treatment layer includes a lithium ion conductive material having lithium ionic conductivity of at least 1×10$^{-10}$ S/cm.

The lithium ion conductive material is preferably a compound represented by Formula 1, and it is stable under the nitrogen atmosphere which uses the evaporation of a lithium metal protection layer, such as LIPON.

The inert gas is preferably selected from helium gas, neon gas, and argon gas, since they do not generate byproducts from the chemical reaction with the lithium metal.

The target may be Li$_3$PO$_4$ or a mixture of Li$_2$O and P$_2$O$_5$ in an appropriate mixing ratio.

The deposition process is performed by any suitable method, such as sputtering, electron beam evaporation, vacuum thermal evaporation, laser ablation, chemical vapor deposition, thermal evaporation, plasma chemical vapor deposition, laser chemical vapor deposition, or jet vapor deposition. It will be understood to one in the related art that the deposition method is not limited to the above methods, and it includes any conventional procedures.

Thereafter, a lithium protection layer is deposited on the pre-treatment layer using a target. The deposition is performed by any suitable procedure and preferably under a nitrogen gas atmosphere. The target may be Li$_3$PO$_4$, the same as the source material for the pre-treatment layer.

Thus, the method of preparing the negative electrode of the present invention can employ any standard deposition procedure. In addition, the method of the present invention can use Li$_3$PO$_4$ as the source material for the pre-treatment layer, which is the source material for the protection layer, so that it is not necessary to use additional equipment or conditions different from the procedure for the conventional protection layer, and the preparation is economical.

Figure 3:
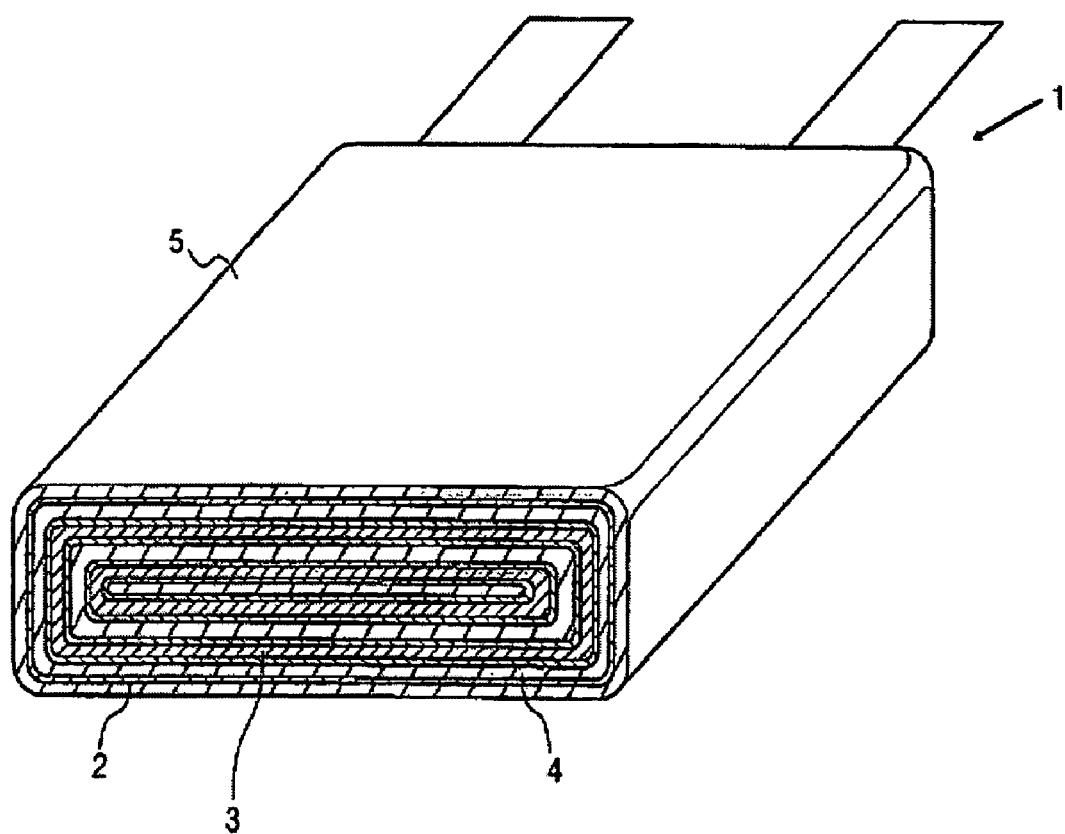
FIG. 3 is a drawing illustrating a lithium-sulfur battery of the invention.

An example of a lithium-sulfur battery according to the invention is shown in FIG. 3. The lithium-sulfur battery 1 includes a positive electrode 3, a negative electrode 4, and a separator 2 interposed between the positive electrode 3 and the negative electrode 4. The positive electrode 3, the negative electrode 4, and the separator 2 are contained in a battery case 5. The electrolyte is present between the positive electrode 3 and the negative electrode 4.

The positive electrode includes a positive active material including elemental sulfur (S$_8$), a sulfur-based compound, or a mixture thereof. The sulfur-based compound may be selected from Li$_2$S$_n$ (n≧1), organic-sulfur compounds, and carbon-sulfur polymers ((C$_2$S$_x$)$_n$: x=2.5 to n≧2).

The electrolyte of the lithium sulfur battery of the present invention includes an electrolytic salt and an organic solvent. The organic solvent may be a sole solvent or a mixed organic solvent with at least two components. The mixed organic solvent includes at least two groups selected from a weak polar solvent group, a strong polar solvent group, or a lithium protection group. Some electrolytes include at least one or more solvents selected from the same group.

The term "weak polar solvent", as used herein, is defined as a solvent that is capable of dissolving elemental sulfur and that has a dielectric coefficient of less than 15. The weak polar solvent may be selected from aryl compounds, bicyclic ethers, and acyclic carbonate compounds. The term "strong polar solvent", as used herein, is defined as a solvent that is capable of dissolving lithium polysulfide and that has a dielectric coefficient of more than 15. The strong polar solvent may be selected from bicyclic carbonate compounds, sulfoxide compounds, lactone compounds, ketone compounds, ester compounds, sulfate compounds and sulfite compounds. The term "lithium protection solvent", as used herein, is defined as a solvent that forms a good protective layer, i.e. a stable solid-electrolyte interface (SEI) layer, on a lithium surface, and that shows a cyclic efficiency of at least 50%. The lithium protection solvent may be selected from saturated ether compounds, unsaturated ether compounds, and heterocyclic compounds including N, O, and/or S.

Examples of the weak polar solvent include xylene, dimethoxyethane, 2-methyltetrahydrofuran, diethyl carbonate, dimethyl carbonate, toluene, dimethyl ether, diethyl ether, diglym, and tetraglyme.

Examples of the strong polar solvents include hexamethyl phosphoric triamide, γ-butyrolactone, acetonitrile, ethylene carbonate, propylene carbonate, N-methyl pyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, and ethylene glycol sulfite.

Examples of the lithium protection solvent include tetrahydrofuran, ethylene oxide, 1,3-dioxolane, 3,5-dimethylisoxazole, 2,5-dimethyl furan, furan, 2-methyl furan, 1,4-oxane, and 4-methyidioxolane.

Examples of electrolyte salts, which are optional for the battery of the invention, include lithium trifluoromethane sulfonimide, lithium triflate, lithium perchlorate, LiPF$_6$, LiBF$_4$, tetraalkylammonium salts such as tetrabutylammonium tetrafluoroborate (TBABF$_4$), liquid state salts at room temperature such as imidazolium salts such as 1-ethyl-3-methylimidazolium bis-(perfluoroethyl sulfonyl) imide (EMIBeti), and mixtures thereof. The concentration of the lithium salt is preferably 0.6 to 2.0M, and more preferably 0.7 to 1.6M. If the concentration of the lithium salt is less than 0.6M, the conductivity of the electrolyte decreases, thereby deteriorating battery performance. If the concentration of the lithium salt is more than 2.0M, the viscosity of the electrolyte increases, thereby deteriorating movement of lithium ions.

The following examples illustrate the present invention in further detail, but it is understood that the present invention is not limited by these examples.

EXAMPLE 1

A $Li_3PO_4$ pre-treatment layer was formed on lithium metal by deposition using a $Li_3PO_4$ target with a diameter of 4 inches under a pressure of 5 mTorr, an RF power of 300W, and an argon atmosphere, for 10 minutes. Thereafter, a LIPON layer for protecting the lithium metal was formed by deposition using the same target under a pressure of 5 mTorr, an RF power of 200W, and a nitrogen atmosphere, for 2 hours, to thereby produce a negative electrode for a lithium sulfur battery.

COMPARATIVE EXAMPLE 1

A negative electrode was produced by the same procedure as in Example 1, except that deposition of the pre-treatment layer was not performed.

The negative electrode according to Comparative Example 1 had a blackish porous lithium compound on its surface, but the negative electrode according to Example 1 had no blackish compound and it exhibited inherent color of the lithium metal.

In order to identify the uniformity and ability to cover of the LIPON protection layer, ethanol was added dropwise to the negative electrodes according to Comparative Example 1 and Example 1. In the negative electrode according to Comparative Example 1, an extreme amount of gas was generated, which indicates that the LIPON protection layer was not uniformly formed on the lithium metal and had poor ability to cover the lithium metal. The negative electrode according to Example 1, however, generated no gas, which indicates that the LIPON layer was uniformly formed on the lithium metal and had good ability to cover the lithium metal by the pre-treatment layer.

EXAMPLE 2

Figure 1:
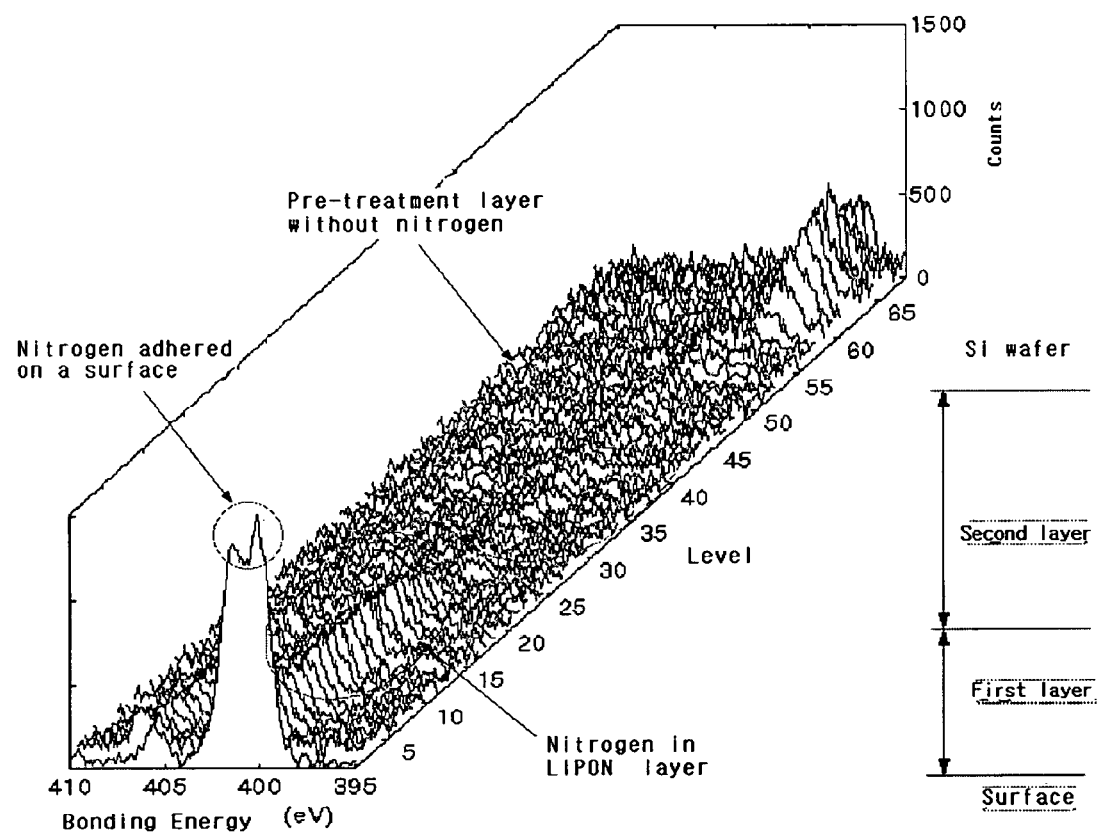
FIG. 1 is a drawing illustrating a result obtained from an XPS analysis of a negative electrode according to Example 2 of the present invention.

A pre-treatment layer and a LIPON protection layer were formed on a silicon wafer under the same conditions as in Example 1. The components in the pre-treatment layer and the protection layer were analyzed in order to identify the presence of nitrogen. The analysis was performed using XPS (X-ray Photo-electron Spectroscopy), and depth profiling was performed. The result is presented in FIG. 1. It is evident from FIG. 1 that one layer with nitrogen (LIPON layer) is clearly distinguished from another layer without nitrogen (pre-treatment layer).

The negative electrode of the present invention has a pre-treatment layer with good ionic conductivity and no volumetric expansion. The pre-treatment layer preparation is preferably performed under an inert gas atmosphere, rendering no contamination of the lithium metal and a simple process.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative electrode for a lithium sulfur battery comprising:
    a lithium metal;
    a pre-treatment layer formed on the lithium metal, the pre-treatment layer having a thickness of 50 to 5000 Å and including a lithium ion conductive material with an ionic conductivity of at least $1 \times 10^{-10}$ S/cm; and
    a protection layer for the lithium metal comprising $Li_aPO_bN_c$, where a is 2 to 4, b is 3 to 5, and c is 0.1 to 0.9.

2. The negative electrode of claim 1, wherein the protection layer for the lithium metal comprises $Li_{2.9}PO_{3.3}N_{0.46}$.

3. The negative electrode of claim 1, wherein the lithium ion conductive material is $Li_3PO_4$.

4. The negative electrode of claim 1, wherein the ionic conductivity of the lithium ion conductive material ranges from $1 \times 10^{-10}$ S/cm to $1 \times 10^{-6}$ S/cm.

5. A method of preparing a negative electrode for a lithium sulfur battery comprising:
    depositing a pre-treatment layer on a lithium metal under an inert gas atmosphere, the pre-treatment layer being deposited to a thickness ranging from about 50 to about 5000 Å and including a lithium ion conductive material with an ionic conductivity of at least $1 \times 10^{-10}$ S/cm; and
    depositing a protection layer for the lithium metal on the pre-treatment layer, wherein the protection layer for the lithium metal comprises $Li_aPO_bN_c$, where a is 2 to 4, b is 3 to 5, and c is 0.1 to 0.9.

6. The method of claim 5, wherein the protection layer for the lithium metal comprises $Li_{2.9}PO_{3.3}N_{0.46}$.

7. A lithium sulfur battery comprising:
    a negative electrode comprising a lithium metal, a pre-treatment layer formed on the lithium metal, having a thickness of 50 to 5000 Å and including a lithium ion conductive material with an ionic conductivity of at least $1 \times 10^{-10}$ S/cm, and a protection layer for the lithium metal;
    a positive electrode comprising a positive active material selected from the group consisting of elemental sulfur, sulfur-based compounds, and mixtures thereof; and
    an electrolyte.

8. The lithium sulfur battery of claim 7, wherein the lithium ion conductive material is $Li_xPO_y$, where $2<x<4$ and $3<y<5$.

9. The lithium sulfur battery of claim 8, wherein the lithium ion conductive material is $Li_3PO_4$.

10. The lithium sulfur battery of claim 7, wherein the ionic conductivity of the lithium ionic conductive material ranges from $1 \times 10^{-10}$ S/cm to $1 \times 10^{-6}$ S/cm.

11. The lithium sulfur battery of claim 7, wherein the protection layer for the lithium metal comprises $Li_aPG_bN_c$, where a is 2 to 4, b is 3 to 5, and c is 0.1 to 0.9.

12. The lithium sulfur battery of claim 11, wherein the protection layer for the lithium metal comprises $Li_{2.9}PO_{3.3}N_{0.46}$.

13. The lithium sulfur battery of claim 7, wherein the protection layer for the lithium metal has a thickness of 1000 Å to 50 μm.

14. The lithium sulfur battery of claim 7, wherein the protection layer is formed on the pre-treatment layer.

* * * * *